United States Patent
Lo et al.

(10) Patent No.: US 9,946,306 B2
(45) Date of Patent: Apr. 17, 2018

(54) ELECTRONIC ASSEMBLY AND ASSEMBLYING METHOD

(71) Applicant: HTC Corporation, Taoyuan County (TW)

(72) Inventors: Chu-Chun Lo, Taoyuan County (TW); Cheng-Min Lin, Taoyuan County (TW); Chun Tseng, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 10 days.

(21) Appl. No.: 14/149,808

(22) Filed: Jan. 8, 2014

(65) Prior Publication Data

US 2015/0192963 A1  Jul. 9, 2015

(51) Int. Cl.
*G06F 1/16* (2006.01)
*B32B 37/12* (2006.01)
*B32B 37/26* (2006.01)

(52) U.S. Cl.
CPC ............ *G06F 1/1658* (2013.01); *B32B 37/12* (2013.01); *G06F 1/1626* (2013.01); *G06F 1/1643* (2013.01); *G06F 1/1656* (2013.01); *B32B 37/26* (2013.01); *B32B 2037/268* (2013.01); *B32B 2457/208* (2013.01)

(58) Field of Classification Search
CPC .... G06F 1/1658; G06F 1/1626; G06F 1/1643; G06F 2457/208; B32B 37/12; B32B 2037/268; B32B 37/26
USPC ..................................................... 361/679.26
See application file for complete search history.

(56) References Cited

U.S. PATENT DOCUMENTS

| 8,294,055 | B2 | 10/2012 | Kim | |
|---|---|---|---|---|
| 2008/0007538 | A1* | 1/2008 | Kotera | G06F 3/0412 345/173 |
| 2010/0033442 | A1* | 2/2010 | Kusuda | G06F 3/041 345/173 |
| 2011/0242655 | A1* | 10/2011 | Jung | G02F 1/13338 359/488.01 |

(Continued)

FOREIGN PATENT DOCUMENTS

| CN | 202253408 | 5/2012 |
|---|---|---|
| CN | 202904520 | 4/2013 |

(Continued)

OTHER PUBLICATIONS

"Office Action of Taiwan Counterpart Application", dated May 19, 2015, p1-p4, in which the listed references were cited.

(Continued)

*Primary Examiner* — Tuan T Dinh
*Assistant Examiner* — Rockshana Chowdhury
(74) *Attorney, Agent, or Firm* — JCIPRNET

(57) ABSTRACT

An electronic assembly includes a transparent adhesive layer, a transparent cover, a display module and a frame. The transparent adhesive layer has a first adhesive surface and a second adhesive surface opposite to the first adhesive surface, the second adhesive surface having a central region and a peripheral region around the central region. The transparent cover is adhered to the first adhesive surface of the transparent adhesive layer. The display module is adhered to the central region of the transparent adhesive layer. The frame has a border carrying part which is adhered to the peripheral region of the transparent adhesive layer.

8 Claims, 6 Drawing Sheets

(56) References Cited

U.S. PATENT DOCUMENTS

| | | | |
|---|---|---|---|
| 2012/0140392 A1* | 6/2012 | Lee | G06F 3/044 |
| | | | 361/679.01 |
| 2012/0194393 A1* | 8/2012 | Uttermann | H01Q 1/243 |
| | | | 343/702 |
| 2012/0262852 A1 | 10/2012 | Cheng | |
| 2012/0281380 A1* | 11/2012 | Werner | G06F 1/1626 |
| | | | 361/807 |
| 2013/0057485 A1 | 3/2013 | Lim | |
| 2013/0127743 A1* | 5/2013 | Chen | G06F 3/041 |
| | | | 345/173 |
| 2013/0141347 A1* | 6/2013 | Wu | G06F 3/041 |
| | | | 345/173 |
| 2013/0199915 A1* | 8/2013 | Guard | G06F 3/044 |
| | | | 200/600 |
| 2013/0265505 A1* | 10/2013 | Hirofumi | H04N 5/642 |
| | | | 348/843 |
| 2013/0280463 A1* | 10/2013 | On | B32B 3/10 |
| | | | 428/38 |

FOREIGN PATENT DOCUMENTS

| | | |
|---|---|---|
| CN | 103324250 | 9/2013 |
| EP | 2341112 | 7/2011 |
| JP | 1078572 | 3/1998 |
| TW | 201024851 | 7/2010 |
| TW | 201312526 | 3/2013 |
| TW | 201321831 | 6/2013 |
| TW | 201342330 | 10/2013 |

OTHER PUBLICATIONS

"Office Action of German Counterpart Application", dated Jan. 20, 2016, p1-p8, in which the listed references were cited.

"Office Action of China Counterpart Application," dated Apr. 28, 2017, p1-p9, in which the listed references were cited.

"Office Action of China Counterpart Application," dated Nov. 24, 2017, p1-p10, in which the listed reference was cited.

* cited by examiner

ELECTRONIC ASSEMBLY AND ASSEMBLYING METHOD

BACKGROUND OF THE INVENTION

Field of the Invention

The present application generally relates to an electronic assembly, and in particular, to a border narrowing electronic assembly and an assembling method corresponding thereto.

Description of Related Art

Since handheld touch devices, such as smart phones and tablet computers, etc., have advantages of multiple functions and convenience to carry, etc., this type of handheld devices becomes more and more popular to consumers. The handheld touch devices are usually equipped with a display module to display an image, and equipped with a transparent cover on the display module. A touch module is disposed between the display module and the transparent cover, and may be equipped with a display panel to display an image for users to input commands via a touch mode.

The display module may be adhered to the central of the transparent cover through an optical clear adhesive (OCA) layer, and the periphery of the transparent cover are adhered to the border carrying part of the frame through the double-sided adhesive tape. However, due to the limitation of the cutting process, the minimum width of the double-sided adhesive tape is 0.8 mm, and the alignment tolerance of the double-sided adhesive tape is 0.2 mm, such that the border carrying part of the frame must have 1 mm width, which is not conducive to the border narrowing.

SUMMARY OF THE INVENTION

The present application is directed to an electronic assembly to reduce the width of the border.

The present application is directed to an assembling method to simplify the difficulty of assembling.

The present application provides an electronic assembly including a transparent adhesive layer, a transparent cover, a display module and a frame. The transparent adhesive layer has a first adhesive surface and a second adhesive surface opposite to the first adhesive surface. The second adhesive surface has a central region and a peripheral region around the central region. The transparent cover is adhered to the first adhesive surface of the transparent adhesive layer. The display module is adhered to the central region of the transparent adhesive layer. The frame has a border carrying part adhered to the peripheral region of the transparent adhesive layer.

The present application provides an assembling method includes the following steps. A transparent adhesive layer, a first releasing layer, a second releasing layer, and a third releasing layer are provided, the transparent adhesive layer having a first adhesive surface and a second adhesive surface opposite to the first adhesive surface, the second adhesive surface having a central region and a peripheral region around the central region, the first releasing layer is disposed on the first adhesive surface of the transparent adhesive layer, the second releasing layer is disposed on the central region of the transparent adhesive layer, and the third releasing layer is disposed on the peripheral region of the transparent adhesive layer. The first releasing layer is tore off to expose the peripheral region of the transparent adhesive layer. A transparent cover is overlapped on the first adhesive surface of the transparent adhesive layer to be adhered to the first adhesive surface. The second releasing layer is tore off to expose the central region of the transparent adhesive layer. A display module is overlapped on the central region of the transparent adhesive layer to be adhered to the central region. The third releasing layer is tore off to expose the peripheral region of the transparent adhesive layer. A border carrying part of a frame is overlapped on the peripheral region of the transparent adhesive layer to be adhered to the peripheral region after the step of overlapping the transparent cover on the first adhesive layer and overlapping the display module on the central region.

Based on the above, in an electronic assembly of the present application, the display module is adhered to the transparent cover through the transparent adhesive layer, the transparent cover is then adhered to the frame through the same transparent adhesive layer, and therefore the conventional desired width and alignment tolerance of the double-sided adhesive tape is omitted, such that the width of the border is reduced. Meanwhile, the conventional materials and assembly costs of the double-sided adhesive tape may be omitted. Besides, in an assembling method of the present application, a plurality of releasing layers cover a plurality of different regions of the transparent adhesive layer respectively, the releasing layers could be tore off sequentially, and the corresponding components are overlapped sequentially on the corresponding surfaces or corresponding regions of the transparent adhesive layer, and thus the components are adhered to the transparent adhesive layers sequentially, such that the difficulty of assembling is simplified.

In order to make the aforementioned and other features and advantages of the present application more comprehensible, several embodiments accompanied with figures are described in detail below.

DESCRIPTION OF THE EMBODIMENTS

Figure 1:
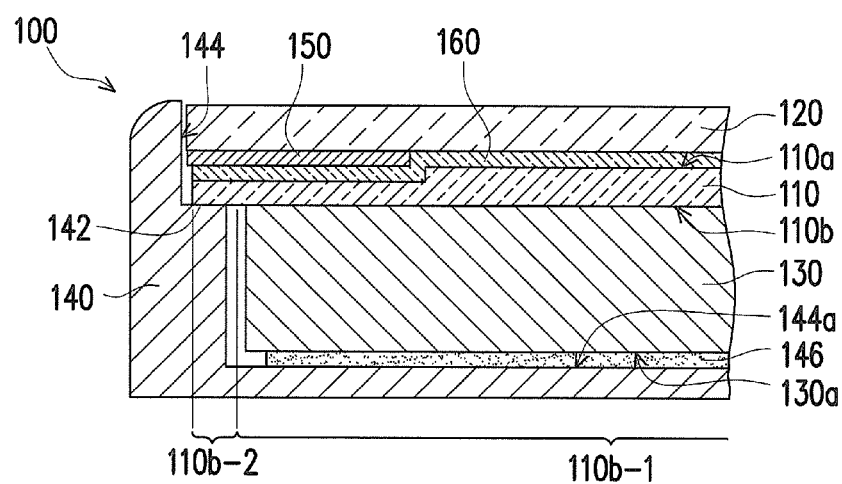
FIG. 1 is a partial cross-sectional view illustrating an electronic assembly according to an embodiment of the present application.

FIG. 1 is a partial cross-sectional view illustrating an electronic assembly according to an embodiment of the present application. Referring to FIG. 1, the electronic assembly 100 of the present embodiment may be adapted to handheld electronic devices, such as smart phones and tablet computers, etc. The electronic assembly 100 includes a transparent adhesive layer 110, a transparent cover 120 (such as a glass cover), a display module 130 (such as a liquid crystal display module) and a frame 140. The transparent adhesive layer 110 has a first adhesive surface 110*a* and a second adhesive surface 110*b* opposite to the first adhesive surface 110*a*, and the second adhesive surface 110*b* has a central region 110*b*-1 and a peripheral region 110*b*-2 around the central region 110*b*-1. The transparent cover 120 is adhered to the first adhesive surface 110*a* of the transparent adhesive layer 110. The display module 130 is adhered to the central region 110*b*-1 of the transparent adhesive layer 110. The frame 140 has a border carrying part 142 which is adhered to the peripheral region 110*b*-2 of the transparent adhesive layer 110. The frame 140 has a receiving slot 144 for installing the transparent cover 120 and the display module 130. Besides, a buffer layer 146 is disposed between a bottom 144a of the receiving slot 144 and a bottom surface 130a of the display module 130, and the material is such as foam or the like, and the buffer layer 146 leans against a bottom of the display module 130. The thickness of the uncompressed buffer layer 146 may be 1 to 3 times the thickness of the compressed buffer layer 146. The disposition of the buffer layer 146 is to reduce the deformation probability of the display module 130. Besides, when the display module 130 is slightly deformed, it may produce a ripple phenomenon, and therefore the buffer layer 146 is used to reduce the deformation probability of the display module 130 for decreasing the occurrence of the ripple.

Referring to FIG. 1 again, the electronic assembly 100 further includes a decorative layer 150. The decorative layer 150 is disposed on the periphery of the transparent cover 120, is located between the transparent cover 120 and the transparent adhesive layer 110, and extends from the peripheral region 110b-1 to the central region 110b-2. Specifically, the decorative layer 150 is formed on the periphery where the transparent cover 120 faces one surface of the transparent adhesive layer 110 to mask the components outside of the display region 132 of the display module 130 for beautifying the appearance. In the present embodiment, the decorative layer 150 may be formed through coating ink on the transparent cover 120. Besides, the electronic assembly 100 may further include a touch module 160. The touch module 160 is located between the transparent cover 120 and the transparent adhesive layer 110 and is disposed on the decorative layer 150. In the present embodiment, after the display module 160 is produced independently, one surface of the touch module 160 may be adhered to the transparent cover 120, and another surface of the touch module 160 may be adhered to the first adhesive surface 110a of the transparent adhesive layer 110. In another embodiment not illustrated, the touch module 160 may also be directly produced on the transparent cover 120.

Figure 2A:
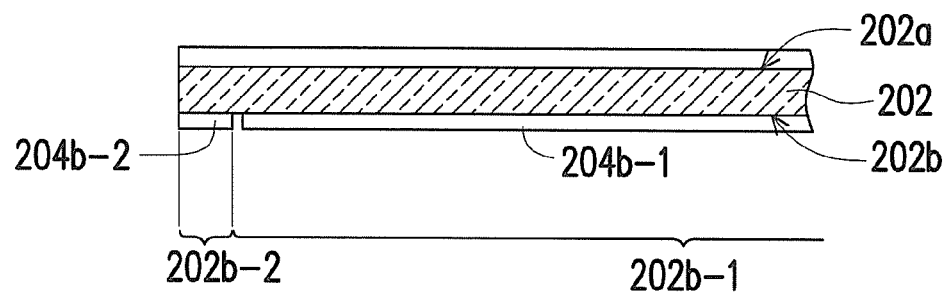
FIG. 2A to 2H are diagrams illustrating an assembling method according to an embodiment of the present application.

FIG. 2A to 2H are diagrams illustrating an assembling method according to an embodiment of the present application. FIG. 3 is a bottom exploded view illustrating a transparent layer and a plurality releasing layers of FIG. 2A. The assembling method of the present embodiment is adapted to the electronic assembly 100 of FIG. 1. Referring to FIG. 2A and FIG. 3, at first, a transparent adhesive layer 202, a first releasing layer 204a, a second releasing layer 204b-1 and a third releasing layer 204b-2 are provided. The transparent adhesive layer 202 has a first adhesive surface 202a and a second adhesive surface 202b opposite to the first adhesive surface 202a. The second adhesive surface 202b has a central region 202b-1 and a peripheral region 202b-2 around the central region 202b-1. The first releasing layer 204a is disposed on the first adhesive surface 202a of the transparent adhesive layer 202. The second releasing layer 204b-1 is disposed on the central region 202b-1 of the transparent adhesive layer 202. The third releasing layer 204b-1 is disposed on the peripheral region 202b-2 of the transparent adhesive layer 202. In the present embodiment, the first releasing layer 204a is a full releasing layer, the second releasing layer 204b-1 is a central releasing layer, and the third releasing layer 204b-2 is a peripheral releasing layer.

Figure 2B:
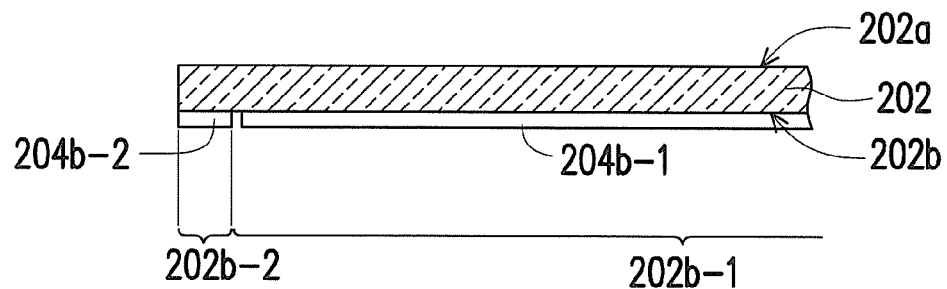
Figure 2C:
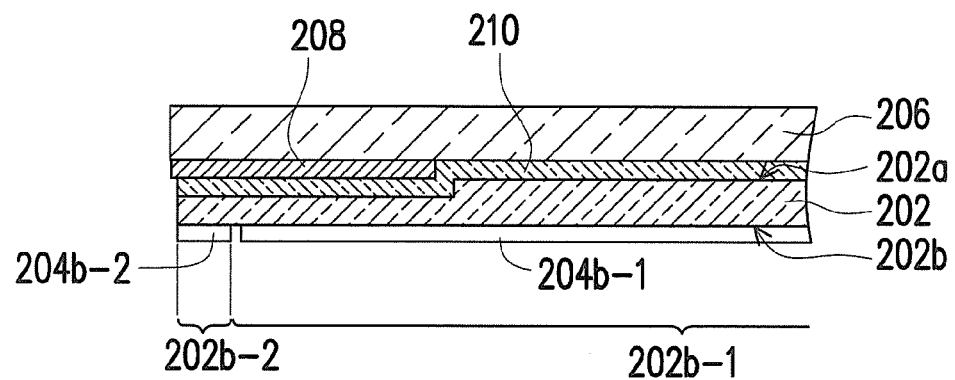
Figure 3:
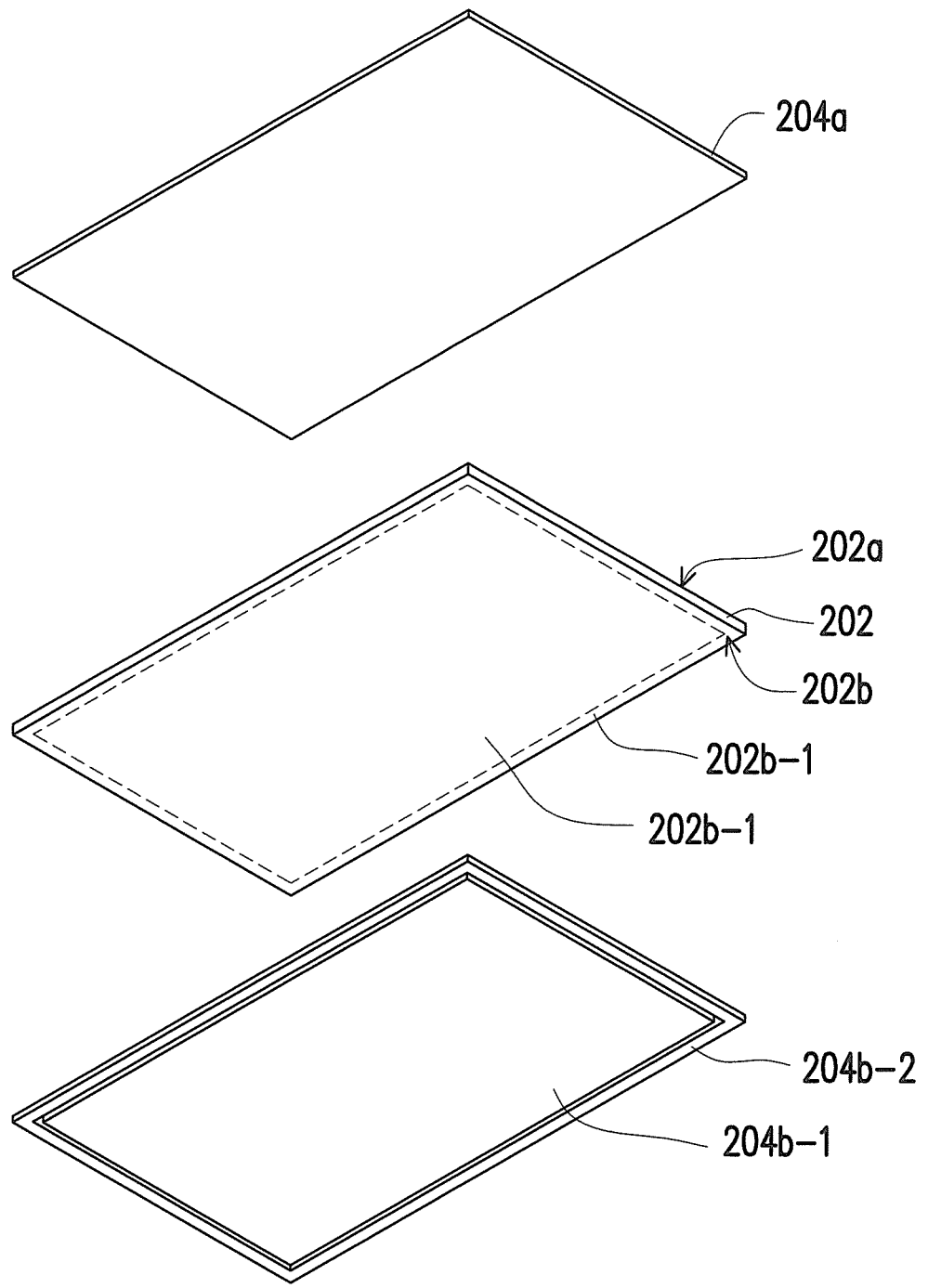
FIG. 3 is a bottom exploded view illustrating a transparent layer and a plurality releasing layers of FIG. 2A.

Referring to FIG. 2B, then, the first releasing layer 204a is tore off to expose the first adhesive surface 202a of the transparent adhesive layer 202. Then, referring to FIG. 2C, a transparent cover 206 is overlapped on the first adhesive surface 202a of the transparent adhesive layer 202 to be adhered to the first adhesive surface 202a through the stickiness of the first adhesive surface 202a. In the present embodiment, a decorative layer 208 has been disposed on the transparent cover 206, and a touch module 210 is adhered to the transparent cover 206 and the decorative layer 208, wherein the touch module 210 is adhered to the first adhesive surface 202a through the stickiness of the first adhesive surface 202a. Therefore, the transparent cover 206 is indirectly adhered to the first adhesive surface 202a through the touch module 210.

Figure 2D:
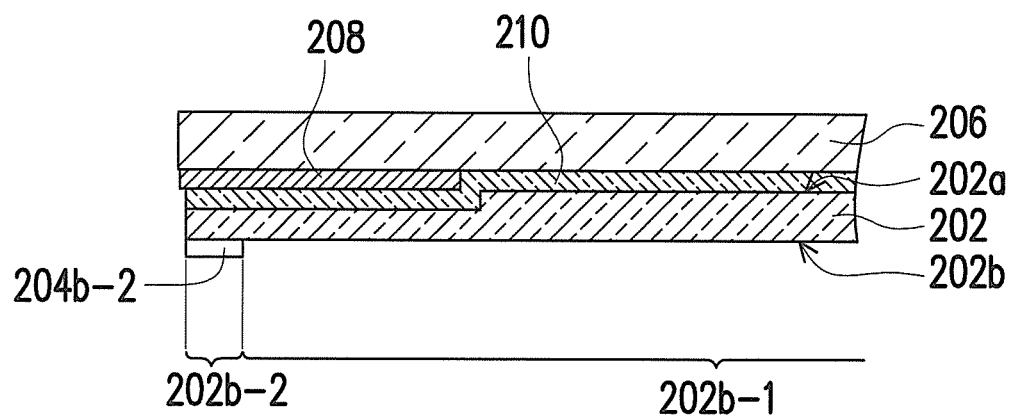
Figure 2E:
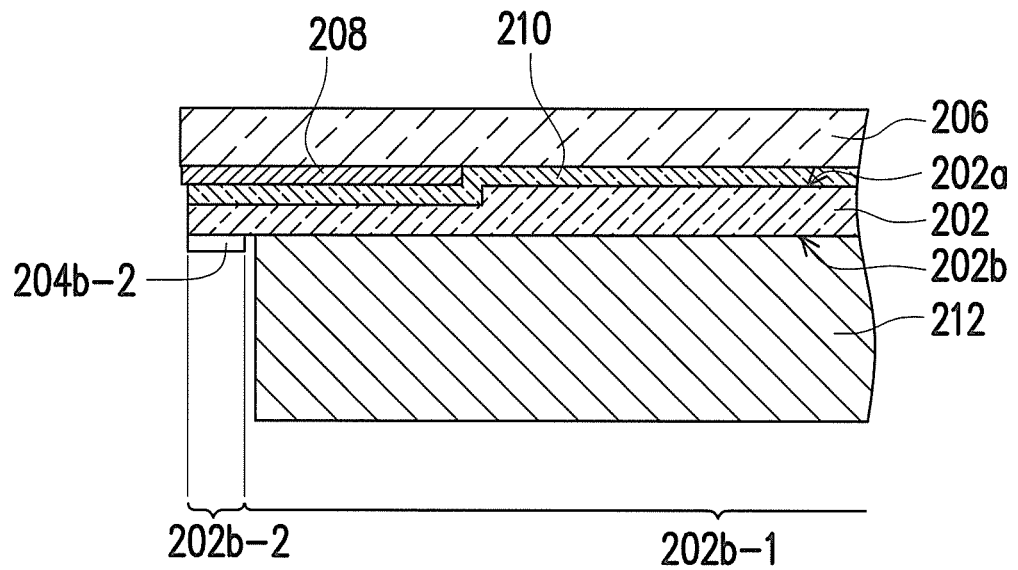

Referring to FIG. 2D, then, the second releasing layer 204b-1 is tore off to expose the central region 202b-1 of the transparent adhesive layer 202. Then, referring to FIG. 2E, a display module 212 is overlapped on the central region 202b-1 of the transparent adhesive layer 202 to be adhered to the central region 202b-1 through the stickiness of the central region 202b-1.

Figure 2F:
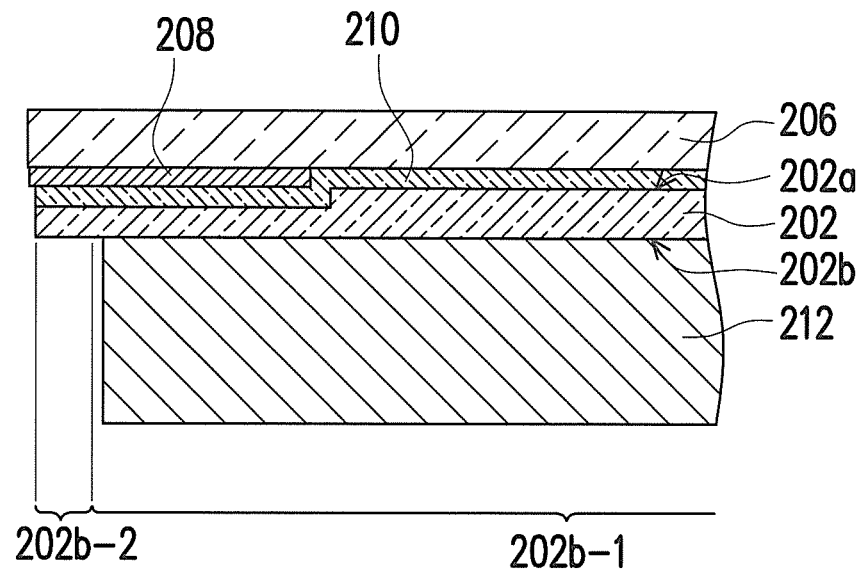
Figure 2G:
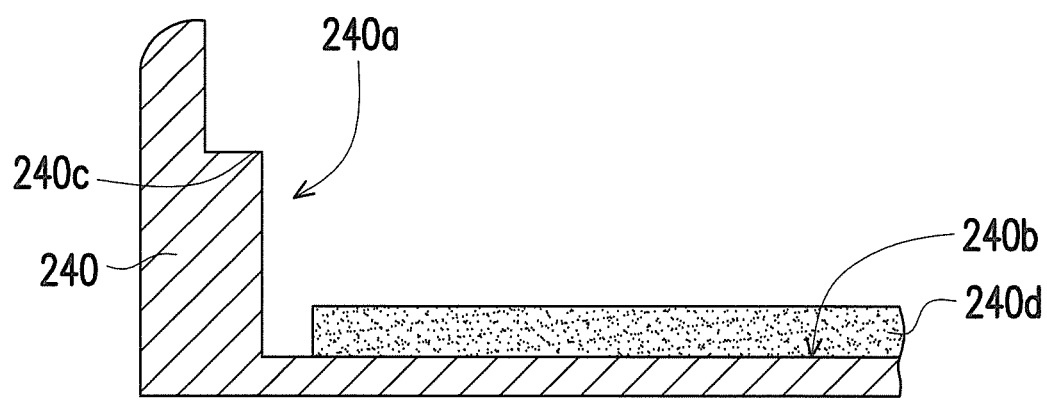
Figure 2H:
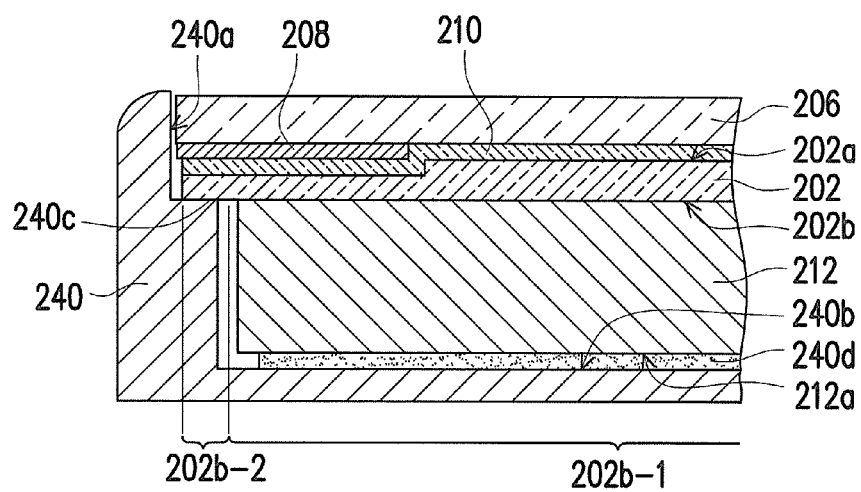

Referring to FIG. 2F, then, the third releasing layer 204b-2 is tore off to expose the peripheral region 202b-2 of the transparent adhesive layer 202. Then, referring to FIG. 2G, a buffer layer 240d is adhered to an inner surface 240b of the frame 240. Then, referring to FIG. 2H, after the step of overlapping the transparent cover 206 on the first adhesive layer 202a and overlapping the display module 212 on the central region 202b-1, a border carrying part 240c of the frame 240 is overlapped on the peripheral region 202b-2 of the transparent adhesive layer 202 to be adhered to the peripheral region 202b-2 through the stickiness of the peripheral region 202b-2. When the border carrying part 240c of the frame 240 is adhered to the peripheral region 202b-2, the buffer layer 240d is compressed through the frame 240 relative to the display module 212, such that the buffer layer 240a leans against a bottom surface 212a of the display module 212.

To sum up, in an electronic assembly of the present application, the display module is adhered to the transparent cover through the transparent adhesive layer and further the transparent cover is adhered to the frame through the same transparent adhesive layer, and therefore the conventional desired width and alignment tolerance of the double-sided adhesive tape is omitted, such that the width of the border is reduced. Meanwhile, the conventional materials and assembly costs of the double-sided adhesive tape may be omitted. Besides, in an assembling method of the present application, a plurality of releasing layers are overlapped respectively on a plurality of different regions of the transparent adhesive layer and then tore off sequentially, and the corresponding components are overlapped sequentially on the corresponding surfaces or corresponding regions of the transparent adhesive layer for the components to be adhered to the transparent adhesive layers sequentially, such that the difficulty of assembling is simplified.

Although the application has been described with reference to the above embodiments, it is apparent to one of the ordinary skill in the art that modifications to the described embodiments may be made without departing from the spirit of the application. Accordingly, the scope of the application will be defined by the attached claims not by the above detailed descriptions.

What is claimed is:
1. An electronic assembly comprising:
a transparent adhesive layer having a first adhesive surface and a second adhesive surface opposite to the first adhesive surface, the second adhesive surface having a central region and a peripheral region around the central region;
a transparent cover adhered to the first adhesive surface of the transparent adhesive layer;

a display module adhered to the central region of the transparent adhesive layer;

a frame having a border carrying part, the border carrying part being adhered to the peripheral region of the transparent adhesive layer, wherein the frame has a receiving slot for installing the transparent cover and the display module, a decorative layer, the transparent cover and the display module are accommodated inside the receiving slot, and the border carrying part adhered to the transparent adhesive layer forms a bottom surface of the receiving slot; and a touch module disposed between the transparent cover and the transparent adhesive layer, wherein the touch module directly contacts with the decorative layer, and a thickness of the touch module in the central region is equal to a thickness of the decorative layer, wherein the decorative layer, the touch module and the transparent adhesive layer are stacked between the transparent cover and the border carrying part, wherein a total thickness of the decorative layer, the touch module and the transparent adhesive layer is equal to a distance between the border carrying part and a surface of the transparent cover facing the first adhesive surface of the transparent adhesive layer.

2. The electronic assembly according to claim 1, wherein the decorative layer is disposed on the periphery of the transparent cover, located between the transparent cover and the transparent adhesive layer, and extending from the peripheral region to the central region.

3. The electronic assembly according to claim 1, further comprising:

a buffer layer installed and compressed between a bottom of the receiving slot and a bottom surface of the display module, and applied force at a bottom of the display module.

4. The electronic assembly according to claim 3, wherein the thickness of the uncompressed buffer layer is 1 to 3 times the thickness of the compressed buffer layer.

5. An electronic assembly comprising:

a transparent adhesive layer having a first adhesive surface and a second adhesive surface opposite to the first adhesive surface, the second adhesive surface having a central region and a peripheral region around the central region;

a transparent cover;

a touch module, one surface thereof adhered to the transparent cover, and another surface adhered to the first adhesive surface of the transparent adhesive layer, wherein the touch module is disposed between the transparent cover and the transparent adhesive layer, wherein the touch module directly contacts with a decorative layer, and a thickness of the touch module in the central region is equal to a thickness of the decorative layer;

a display module adhered to the central region of the transparent adhesive layer; and a frame having a border carrying part, the border carrying part being adhered to the peripheral region of the transparent adhesive layer, wherein the frame has a receiving slot for installing the transparent cover and the display module, the decorative layer, the transparent cover and the display module are accommodated inside the receiving slot, and the border carrying part adhered to the transparent adhesive layer forms a bottom surface of the receiving slot, wherein the decorative layer, the touch module and the transparent adhesive layer are stacked between the transparent cover and the border carrying part, wherein a total thickness of the decorative layer, the touch module and the transparent adhesive layer is equal to a distance between the border carrying part and a surface of the transparent cover facing the first adhesive surface of the transparent adhesive layer.

6. The electronic assembly according to claim 5, wherein the decorative layer is disposed on the periphery of the transparent cover, located between the transparent cover and the transparent adhesive layer, and extending from the peripheral region to the central region.

7. The electronic assembly according to claim 5, further comprising:

a buffer layer installed between a bottom of the receiving slot and a bottom surface of the display module and leaning against a bottom of the display module.

8. The electronic assembly according to claim 7, wherein the thickness of the uncompressed buffer layer is 1 to 3 times the thickness of the compressed buffer layer.

* * * * *